UNITED STATES PATENT OFFICE.

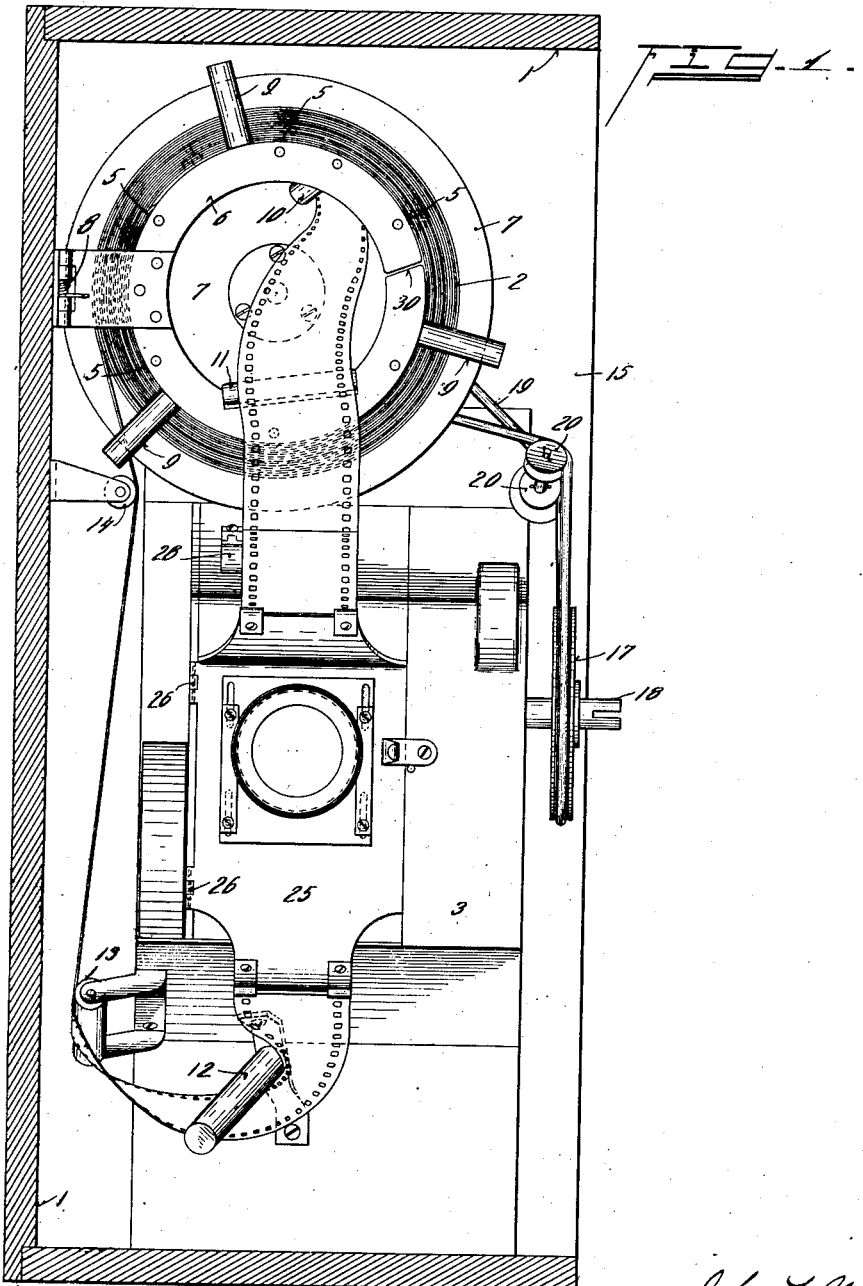

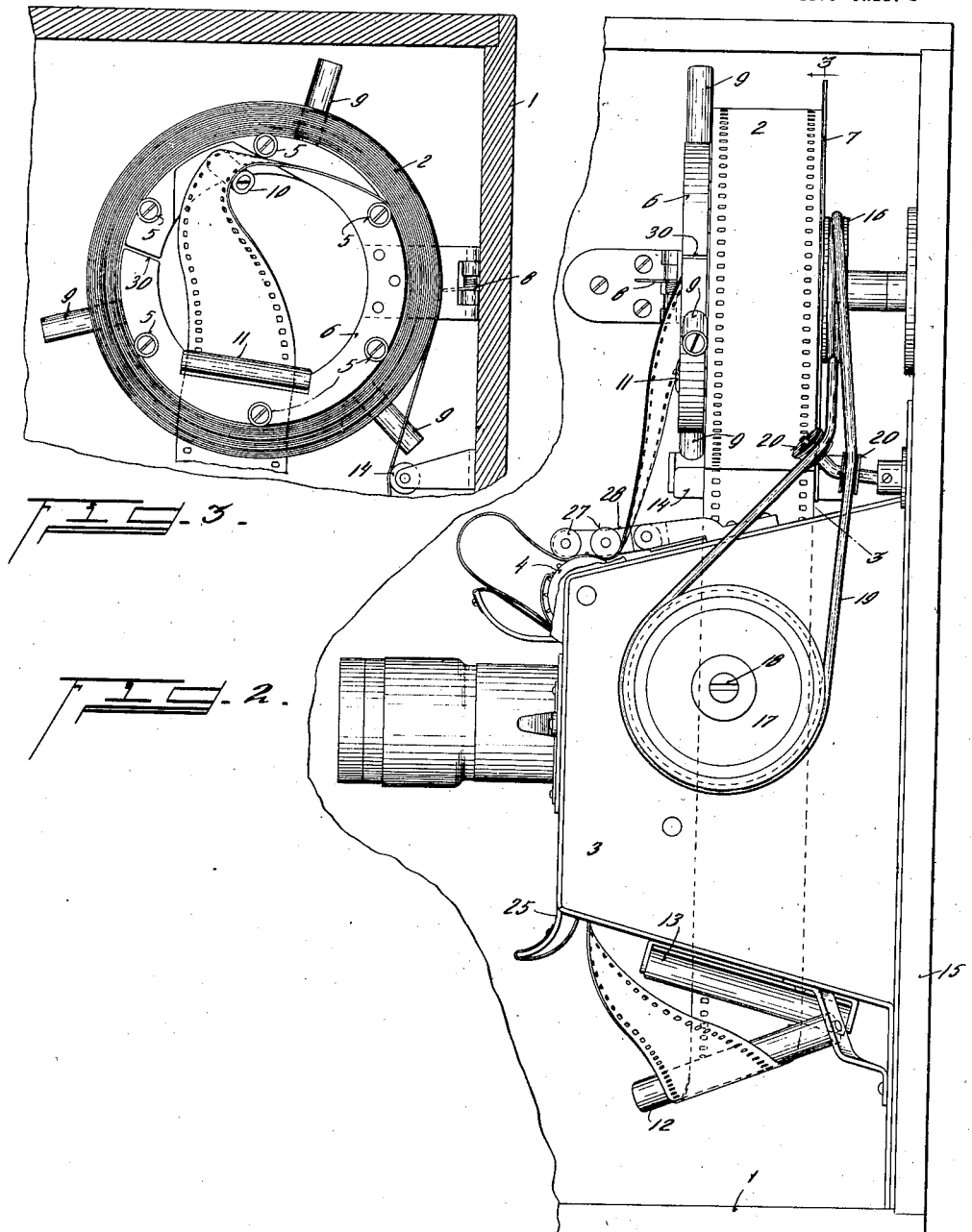

JOHN T. WELLS, OF NEWPORT, KENTUCKY, ASSIGNOR TO THE EDWARDS MANUFACTURING COMPANY, OF CINCINNATI, OHIO, A CORPORATION OF OHIO.

MOTION-PICTURE DEVICE.

1,295,653.
Specification of Letters Patent.
Patented Feb. 25, 1919.

Application filed January 31, 1916. Serial No. 75,191.

*To all whom it may concern:*

Be it known that I, JOHN T. WELLS, a citizen of the United States, and residing at Newport, in the county of Campbell and State of Kentucky, have invented a new and useful Improvement in Motion-Picture Devices, of which the following specification is a full disclosure.

My invention relates to a mechanism for operating an endless flexible strip, such as a record or film strip, one portion of which is wound upon itself to form a hollow roll, and the other portion of which forms a loop run from the inner to the outer peripheries of the roll portion.

The object of the invention is to provide such an endless strip for continuous operation and to provide a roll-operating mechanism therefor, in the way of a unitary unwinding and rewinding rotary driven device which will take the record strip from the inner roll periphery and rewind it upon an outer roll periphery, exerting at the same time a convolving transmitting influence on the roll convolutions to maintain it at its normal diameter, that is, to constantly condense the roll just proportionately to the unwind and rewind. Guide and support devices may be employed to variously utilize the loop run.

To this end the roll is preferably supported on a holder of journal-like character movably supporting the roll to permit the unwinding and rewinding as well as the co-ordinate diametrical compacting necessary to maintain the normal roll diameter.

It is immaterial to the broader principles of the invention whether the loop or slack portion of the roll represented by that portion of the strip unmoved from the roll, is an idler or is functional. Such traveling loop portion may, if desired function as an actuator in relation to a member to be actuated. But in the preferred form of the invention, the principles of the invention are utilized in that class of mechanisms which operate a record strip in relation to some form of reproducing instrumentality as may be exemplified by a music roll or the film of a moving picture machine. As illustrated in the drawings, the invention is shown as applied to a moving picture machine in which the traveling loop portion of the strip drawn from the inner periphery of the record roll is conducted past the exposure area either for taking, printing or projecting pictures, and rewound upon the outer periphery of the record roll.

Also, specifically, although not of the essence of the invention, the mechanism is illustrated in connection with a moving picture projector, the object being to produce a continuous moving picture requiring no attention from the operator, and the utilization of this type of record roll enables the use of a long film within the small compass provided by the dimensions of a conventional moving picture projector.

The broader principles of the invention, as well as the specific utilization just named, will be readily understood from the description of the accompanying drawings, forming a part of this specification and illustrating the moving picture embodiment of the invention, in which:—

Figure 1 is a front elevation.

Fig. 2 is a right side elevation.

Fig. 3 is a partial section on line 3—3, Fig. 2.

The mechanism as illustrated is supported in a box or casing 1, the film roll 2 being positioned above a film feed unit 3. The operating mechanism of said unit may be of any desired type having intermittently operated feed mechanism for feeding the film past the focal aperture. The form shown in the drawings includes a constantly driven feed sprocket 4 which engages and withdraws the film from the film or record roll 2.

The film roll 2 is carried by a record roll holder comprising a series of rollers 5 projecting laterally from a supporting annulus 6 which is hingedly mounted on the side wall of the casing 1 and yieldingly urged by a coil spring 8 surrounding the pivot pin of the hinge and engaging the leaves of the hinge toward a rotary driven element, constituting in coaction with the journally supported record roll, a unitary unwinding, rewinding and record roll normalizer, the preferred specific instrumentality, being shown as a take-up disk 7. The annulus 6 is provided with a film slit 30 through which the film is laterally removed or inserted.

Radial rollers 9 mounted on the periphery of the annulus 6 engage one edge of the film roll 2 and force the opposite edge into frictional engagement with the surface of the take-up disk 7, said surface being covered with fabric, such as velvet or felt, to prevent injury to the film and to provide the proper degree of friction to perform the desired function as will hereinafter be described.

This friction surface being formed of a compressible material readily conforms itself to any unevenness of the contacting side of the film roll, thereby permitting a coöperative frictional engagement with each convolution of said roll.

The film is withdrawn by the film feed unit, from the inner periphery of the film roll 2 over guide rollers 10, 11, and through the annulus 6. After the film passes through the film feed unit in a plane transverse to the axis of the roll, it is guided over guide rollers 12, 13, which restore the film to the normal film plane, and then upwardly at one side of said unit past a guide roller 14 and is wound on the outer periphery of the film roll 2.

The record operating member 7 is loosely journaled on the wall 15 of the casing 1 and is provided with a drive pulley 16 which is in driving connection with a pulley 17 on the power shaft 18 of the film feed unit, through a belt 19. Said belt is properly guided by sleeves 20 and drives the take-up disk at a speed which is slightly in excess of the speed of film withdrawal. This slight excess of the speed of the take-up disk insures a roll of uniform size and compactness.

The action of member 7 upon the edge or side of the film roll is very similar to the winding of a roll of paper by placing the palm of the hand on the end of the roll and then rotating the hand. That is to say it exerts a convolving transmitting influence on the roll functioning for unwinding and rewinding, and also to compact or condense the side of the roll radially, to keep the roll of uniform or normal diameter.

Of course, in inserting or removing an endless film into and from a film feed unit it is necessary that the parts be so arranged that the film may be moved laterally into and out of said unit.

As shown in a preferred form in the drawings, the lens supporting or film retaining plate 25 is hinged at 26 to swing horizontally, so as to permit a free lateral removal of the film. Also, the pressure rollers 27 which retain the film in engagement with the film sprocket 4 are supported at one end only in a spring tensioned arm 28. When the rollers 27 are elevated the film may be laterally moved from engagement with the sprocket.

Many other forms of film feed unit could be adapted for use in connection with my improved film feed mechanism, the form shown being intended only to more clearly illustrate one of the many uses to which my invention may be applied.

Having described my invention, I claim as new and desire to secure by Letters Patent of the United States:—

1. A device for operating an endless record strip having a wound supply roll portion and an unwound traveling loop portion, comprising mechanism coördinating with the strip to continuously unwind from the inner periphery and rewind upon the outer periphery of said roll portion, a non-rotative roll support, and a rotary drive element frictionally engaging the side of the roll for exerting a convolving, transmitting influence upon the roll convolutions maintaining a constant roll diameter.

2. A device for operating an endless record strip having a wound supply roll portion and an unwound traveling loop portion, comprising mechanism coördinating with the strip to continuously unwind from the inner periphery and rewind upon the outer periphery of said roll at constant points, a non-rotative roll support and a rotary drive element frictionally engaging the side of the roll for exerting a convolving, transmitting influence upon the roll convolutions maintaining a constant roll diameter.

3. A device for operating an endless film having a roll portion and a loop portion, a drive element frictionally engaging the side of the roll, a roll support yieldingly retaining the roll in coöperative contact with said element, devices for unwinding the film from the inner periphery of the roll to replenish the loop portion, and guide means entraining the loop portion to the outer periphery of the roll to replenish said roll.

4. In a device of the class described operating an endless film having a wound supply roll portion and an unwound traveling portion, comprising devices for unwinding the film from the inner periphery of the roll to replenish the traveling portion, a rotary drive element frictionally engaging the side of the roll portion for exerting a convolving, transmitting influence upon the roll convolutions to rewind the traveling portion on the outer periphery of the roll, and a roll support yieldingly retaining the roll in coöperative contact with the drive element.

5. A device of the nature disclosed operating an endless strip having a wound supply roll portion and an unwound traveling portion, comprising devices for unwinding the strip from the inner periphery of the roll to replenish the traveling portion, a roll support and a rotary drive element frictionally engaging the side of the roll for exerting a convolving, transmitting influence upon the roll convolutions to wind the traveling portion on the outer periphery of the roll and maintain a constant roll diameter.

6. A device for operating an endless record strip having a wound supply roll portion, and an unwound traveling loop portion, devices for unwinding the strip from the inner periphery of the roll at a predetermined speed to replenish the traveling loop portion, and a driven rotary element operating at a higher speed, said element frictionally engaging the side of the roll portion to exert a convolving transmitting influence on the roll convolutions to maintain a constant roll diameter.

7. A device of the nature disclosed combining a non-rotative member supporting a roll of film, said member being apertured for film passage, a driven element for rotating the film roll, and means causing a yielding frictional coöperative engagement of said driven element and the side of the film roll.

8. A device of the nature disclosed operating an endless film having a wound supply roll portion and an unwound traveling portion, a non-rotative member supporting the supply roll, said member being apertured for film passage, devices for unwinding the film from the inner periphery of the supply roll, a driven element for winding the traveling portion of the film on the outer periphery of the supply roll and exerting a convolving transmitting influence on the roll convolutions to maintain a constant roll diameter, and means yieldingly retaining the side of the roll in frictional coöperative engagement with the driven element.

9. A device of the nature disclosed operating an endless film having a wound supply roll portion and an unwound traveling loop portion, means engaging the loop portion to unwind the film from the inner periphery of the roll, a support for the roll apertured for film passage, and a rotary driving element frictionally engaging the side of the roll to rotate said roll and rewind the loop portion of the film on the outer periphery thereof, the rewinding influence of the driving element dominating the unwinding influence of the loop engaging means to maintain a constant roll diameter.

10. A device of the nature disclosed for operating an endless film having a wound supply roll portion and an unwound traveling loop portion, a rotary roll driving element, a roll supporting device combining a non-rotative translatory member having anti-friction elements supporting the roll axially coincident with the roll driving element, radial anti-friction elements carried by said member and engaging one side of the film roll and tension means acting through the translatory member and radial anti-friction elements to yieldingly hold the opposite side of the roll in frictional coöperative engagement with the roll driving element.

11. A device of the class described comprising a reproducing unit coöperating with an endless film having a wound supply roll portion and an unwound traveling loop portion, a nonrotative element supporting the roll and apertured for film passage, means incorporated in the reproducing unit for withdrawing the film from the inner periphery of the roll and presenting it to said unit in a plane transverse to the axis of the roll, means guiding the loop portion from said unit to the outer periphery of the roll and restoring to the normal film plane, and a driven element frictionally engaging the side of the roll for exerting a convolving transmitting influence upon the roll convolutions maintaining a constant roll diameter.

12. In a device of the class described, an endless sprocket apertured film strip, one portion of which is wound upon itself in the form of a hollow roll, and the other portion of which forms a loop run from the inner to the outer peripheries of the roll portion, a roll holder permitting of the unwinding and rewinding of the roll, a feed mechanism engaging the loop portion of the film, a rotary member driven in coördination with the film feed mechanism and engaging the side portion of the roll, said member exerting a direct unwinding and rewinding influence on the convolutions of the film roll, maintaining a constant roll diameter, and guide and support devices for the film loop directing the film travel from the inner to the outer roll peripheries.

13. A device for operating an endless film having a wound supply roll portion and an unwound loop portion, a nonrotative support for the film roll, devices for unwinding the film from the inner periphery of the roll to replenish the loop portion, means guiding the loop portion to the outer periphery of the roll, and a drive element exerting a frictional driving influence on the film for rotating the roll and maintaining a constant roll diameter.

14. A device of the nature disclosed for operating an endless film having a wound supply roll portion and an unwound traveling loop portion, devices for unwinding the film from the inner periphery of the roll to replenish the loop portion, means directing the loop portion to the outer periphery of the roll to replenish the roll, a support, an annular series of roll supporting rollers non-rotative as a series and projecting laterally from said support, and a drive element frictionally engaging the side of the roll.

15. In a device of the class described, a non-rotative film roll holder, a rotary driving element having a compressible friction surface engaging the convolution edges of the film, and means for feeding the film.

16. In a device of the class described, a nonrotative translatory film roll holder, a rotary driving element adjacent said holder, means yieldingly urging the holder toward the driving element to cause a coöperative frictional engagement of said driving element and the side of the film roll, and means for feeding the film.

17. In a device of the class described, a film roll supporting element, an axially alined rotary driving element, means yieldingly urging one element toward the opposing element to cause a frictional coöperative engagement of the driving element and the side of the film roll, and means for feeding the film.

18. In a device of the class described, a film roll support engaging the inner periphery and one side of the film roll, a rotary drive element frictionally engaging the opposing side of the roll, and means for feeding the film.

19. In a device of the class described, a film roll support engaging the inner periphery and one side of the film roll, a rotary drive element frictionally engaging the opposing side of the roll, means yieldingly retaining the support and the drive element in coöperative engagement with the roll, and means for feeding the film.

20. In a device of the class described, a film roll support, an annular series of roll supporting rollers non-rotative as a series and projecting laterally from said support, a drive element frictionally engaging the side of the film roll, and means for feeding the film.

21. In a device of the class described, a film roll support, an annular series of roll supporting rollers non-rotative as a series and projecting laterally from said support, a film guide roller axially disposed at an angle to the axis of the roll to direct the film from the inner periphery of the roll to a plane transverse to the axis of the roll, a drive element frictionally engaging the side of the roll, and means for feeding the film.

In witness whereof, I hereunto subscribe my name, as attested by the two subscribing witnesses.

JOHN T. WELLS.

Witnesses:
   CLARENCE B. FOSTER,
   L. A. BECK.